March 20, 1956 L. G. POLLARD ET AL 2,739,029

STYLUS FACSIMILE RECORDERS

Filed Dec. 19, 1950 15 Sheets-Sheet 1

INVENTORS
L. G. POLLARD
G. H. RIDGE
A. HOFER

BY

ATTORNEY

STYLUS FACSIMILE RECORDERS

Filed Dec. 19, 1950 15 Sheets-Sheet 2

INVENTORS
L. G. POLLARD
G. H. RIDGE
A. HOFER
BY
A. A. Thomas
ATTORNEY

March 20, 1956 L. G. POLLARD ET AL 2,739,029

STYLUS FACSIMILE RECORDERS

Filed Dec. 19, 1950 15 Sheets-Sheet 3

*INVENTORS*
L. G. POLLARD
G. H. RIDGE
A. HOFER

*BY* A. A. Thomas
ATTORNEY

March 20, 1956 | L. G. POLLARD ET AL | 2,739,029

STYLUS FACSIMILE RECORDERS

Filed Dec. 19, 1950 | 15 Sheets-Sheet 4

*INVENTORS*
L. G. POLLARD
G. H. RIDGE
A. HOFER

*BY* A. A. Thomas
ATTORNEY

INVENTORS
L. G. POLLARD
G. H. RIDGE
A. HOFER
BY
A. A. Thomas
ATTORNEY

INVENTORS
L. G. POLLARD
G. H. RIDGE
A. HOFER
BY
A. A. Thomas
ATTORNEY

March 20, 1956 L. G. POLLARD ET AL 2,739,029

STYLUS FACSIMILE RECORDERS

Filed Dec. 19, 1950 15 Sheets-Sheet 7

INVENTORS
L. G. POLLARD
G. H. RIDGE
A. HOFER

BY A. A. Thomas
ATTORNEY

INVENTORS
L. G. POLLARD
G. H. RIDGE
A. HOFER
BY
A. H. Thomas
ATTORNEY

March 20, 1956 L. G. POLLARD ET AL 2,739,029

STYLUS FACSIMILE RECORDERS

Filed Dec. 19, 1950 15 Sheets-Sheet 9

*INVENTORS*
L. G. POLLARD
G. H. RIDGE
A. HOFER

*BY* A. A. Thomas
ATTORNEY

March 20, 1956 L. G. POLLARD ET AL 2,739,029

STYLUS FACSIMILE RECORDERS

Filed Dec. 19, 1950 15 Sheets-Sheet 10

INVENTORS
L. G. POLLARD
G. H. RIDGE
A. HOFER

BY A. L. Thomas
ATTORNEY

INVENTORS
L.G. POLLARD
G.H. RIDGE
A.HOFER

BY A. A. Thomas
ATTORNEY

INVENTORS
L. G. POLLARD
G. H. RIDGE
A. HOFER
BY
A. A. Thomas
ATTORNEY

INVENTORS
L. G. POLLARD
G. H. RIDGE
A. HOFER
BY
A. A. Thomas
ATTORNEY

March 20, 1956 L. G. POLLARD ET AL 2,739,029

STYLUS FACSIMILE RECORDERS

Filed Dec. 19, 1950 15 Sheets-Sheet 14

*INVENTORS*
L. G. POLLARD
G. H. RIDGE
A. HOFER

*BY*

A. A. Thomas

ATTORNEY

March 20, 1956 L. G. POLLARD ET AL 2,739,029

STYLUS FACSIMILE RECORDERS

Filed Dec. 19, 1950 15 Sheets-Sheet 15

INVENTORS
L.G. POLLARD
G.H. RIDGE
A.HOFER

BY A. A. Thomas
ATTORNEY 2,739,029

STYLUS FACSIMILE RECORDERS

Leon G. Pollard and Guy H. Ridge, Southampton, and Adolph Hofer, Hampton Bays, N. Y., assignors to The Western Union Telegraph Company, New York, N. Y., a corporation of New York Application December 19, 1950, Serial No. 201,608

7 Claims. (Cl. 346—24)

This invention relates to facsimile recorders of the stylus type and its object is to provide a new and improved machine for the automatic recording of facsimile telegrams at a terminal station connected with a main office.

Our automatic recorder is in some respects similar to the three-stylus belt machine disclosed in the pending application of Hallden and Zabriskie Serial No. 83,333, filed March 25, 1949, now Patent No. 2,639,211, but it differs from that earlier machine in several important particulars. Whereas the Hallden and Zabriskie recorder was primarily designed for concentrator use at a main office where an attendant would always be present to connect the machine with a calling subscriber's transmitter, the recorder of the present invention is equipped with novel features for the automatic facsimile recording of messages sent from the main office while the machine is unattended.

The only personal attention our recorder requires is the removal of received messages from a compartment in the machine, replenishing the supply of recording paper, and replacing worn styluses. This machine is therefore especially suitable for installation in hotels, apartment house lobbies, and other terminal stations operating as telegraph agencies.

Considered more specifically, the new equipment of our automatic recorder includes a scanning head located at the top of the machine as a unitary support for the stylus recording assembly, the paper supporting platen and the paper feed mechanism.

The stylus recording assembly is mounted as a unit on a horizontal gate which is hinged to the scanning head at the left and releasably secured to the head at the right end, so that the gate can be swung out of the way of the platen or for removal when necessary. This hinged gate carries on its inner face a pair of sprocket wheels supporting an endless metal belt on which several styluses (usually three) are mounted in properly spaced relation. The belt is driven by a synchronous motor secured to the outer face of the gate.

Behind the recording gate is a floating platen adapted to hold a sheet of paper in flat recording position. A synchronous motor feeds the paper slowly downward through the platen from a supply roll located at the rear of the scanning head. After emerging from the platen, the paper passes down through a slot in the base of the recording head and a motor operated knife automatically cuts off the same length of paper after each recording cycle. The severed telegram sheet drops into a compartment at the bottom of the machine for removal by the attendant.

The recording path of the styluses in this machine is along the lower loop or run of the belt, so that the recording is done from right to left and upside down (as viewed from the front) on the downward moving paper. This method of recording involves, as far as we know, a concept of basic novelty and we claim it as such.

The foregoing and other distinctive features of our recorder will be fully brought out in the description of the accompanying drawings in which—

Figures 2, 2A, 2B, 2C:
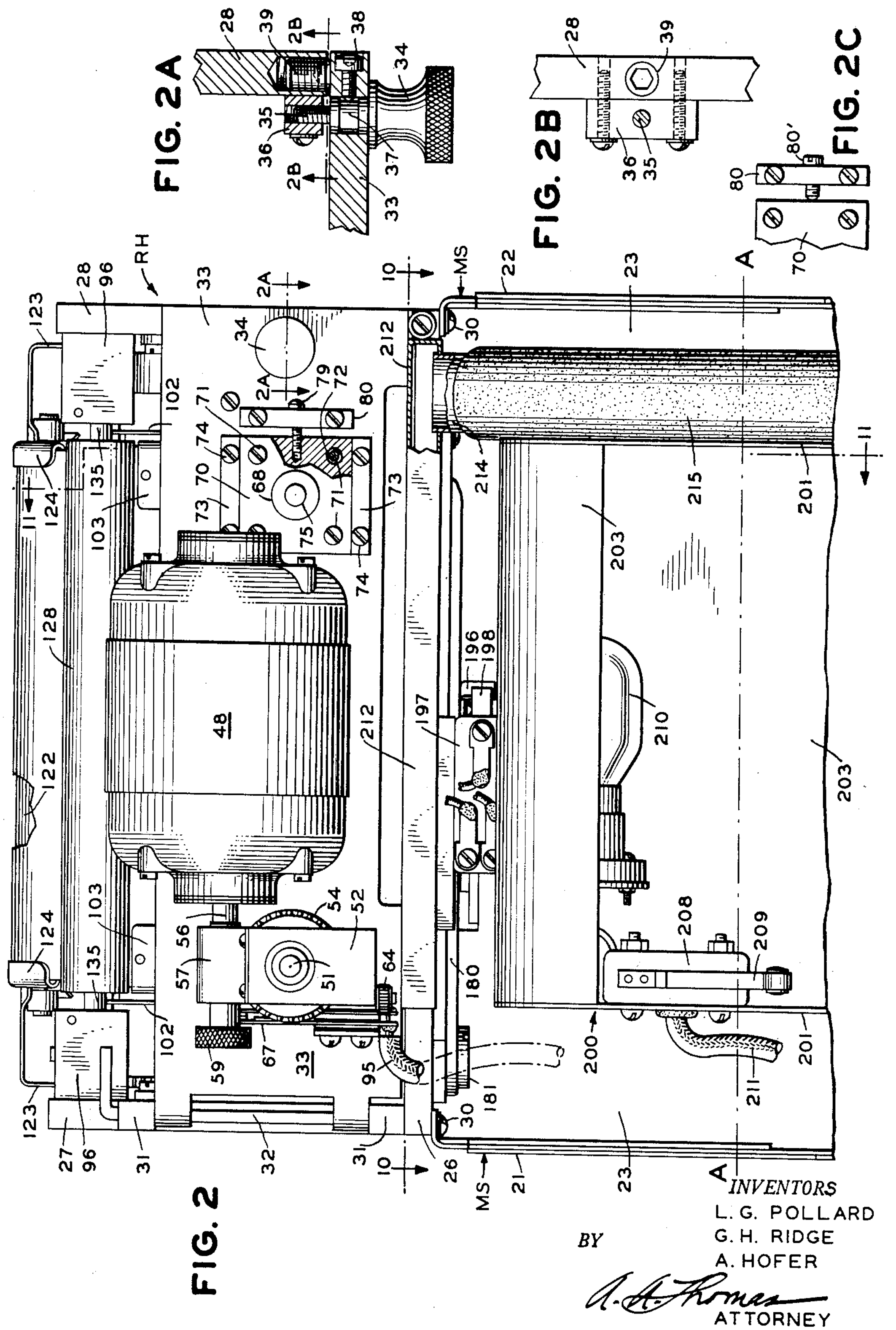
Fig. 2 is a front view of the upper half of the machine, with the cover removed.
Fig. 2A shows a detail on line 2A of Fig. 2.
Fig. 2B is a section on line 2B of Fig. 2A.
Fig. 2C shows a modified detail of Fig. 2.
Figure 5:
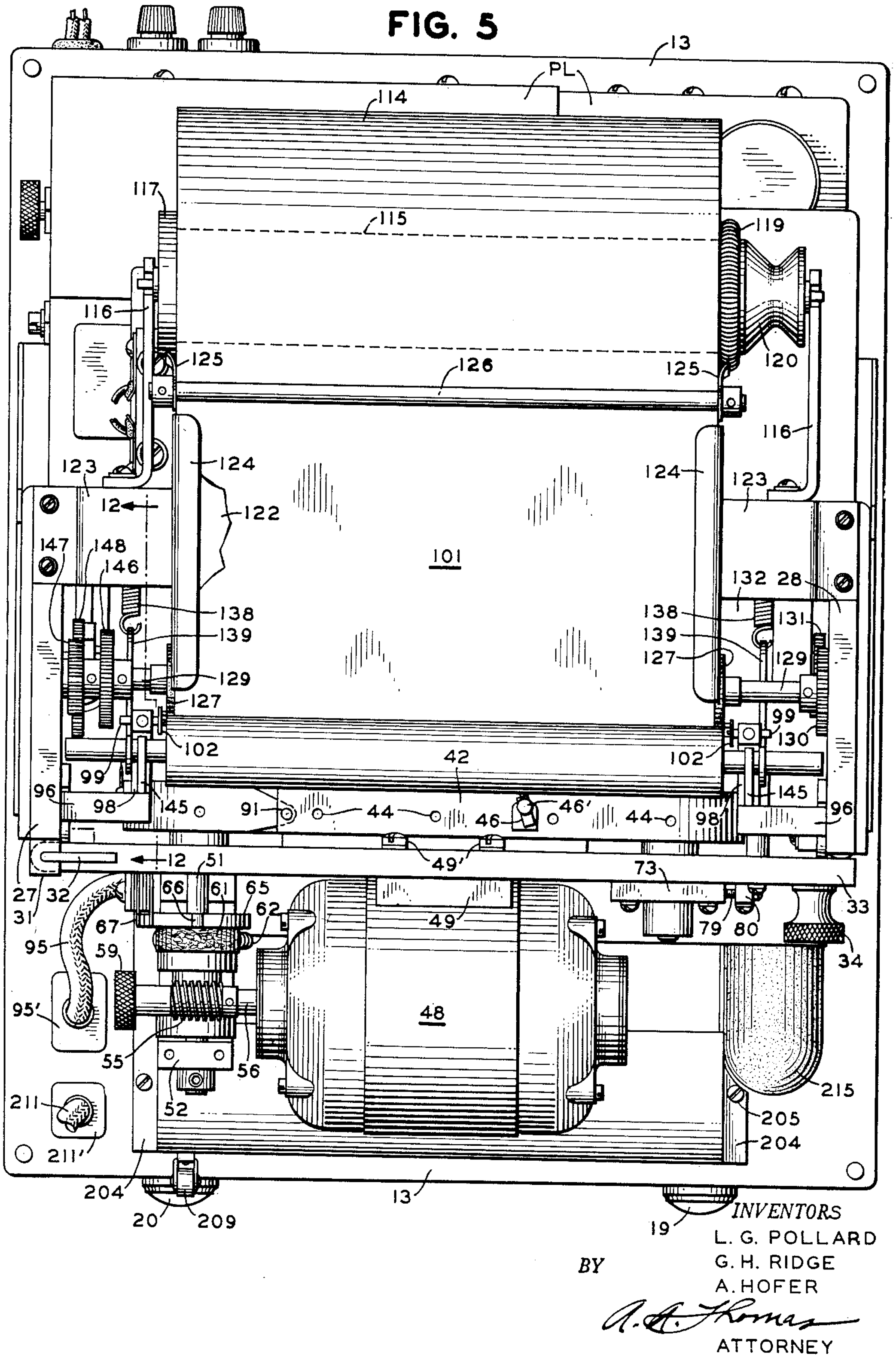
Fig. 5 is a top view of the machine.
Figure 6:
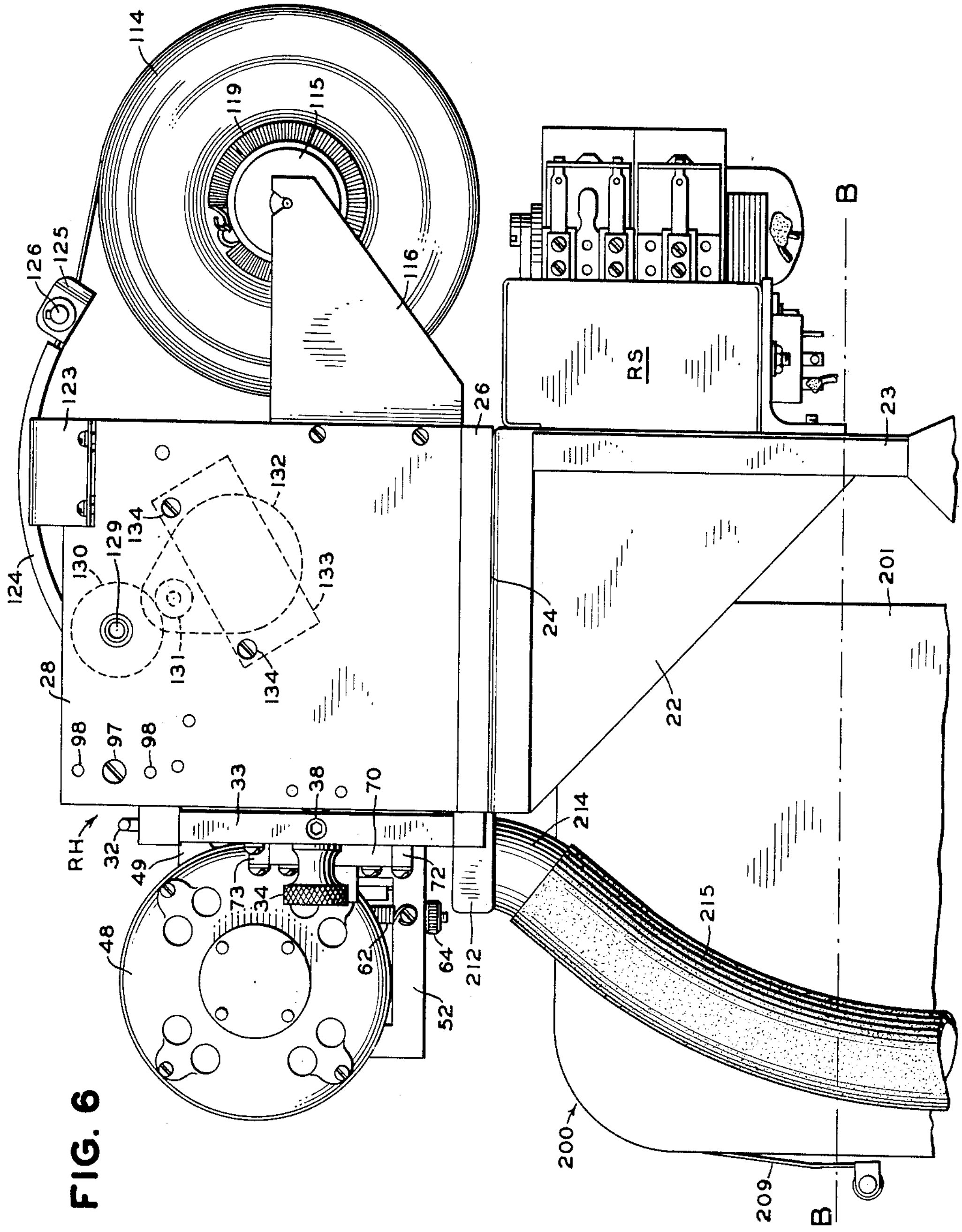
Figure 7:
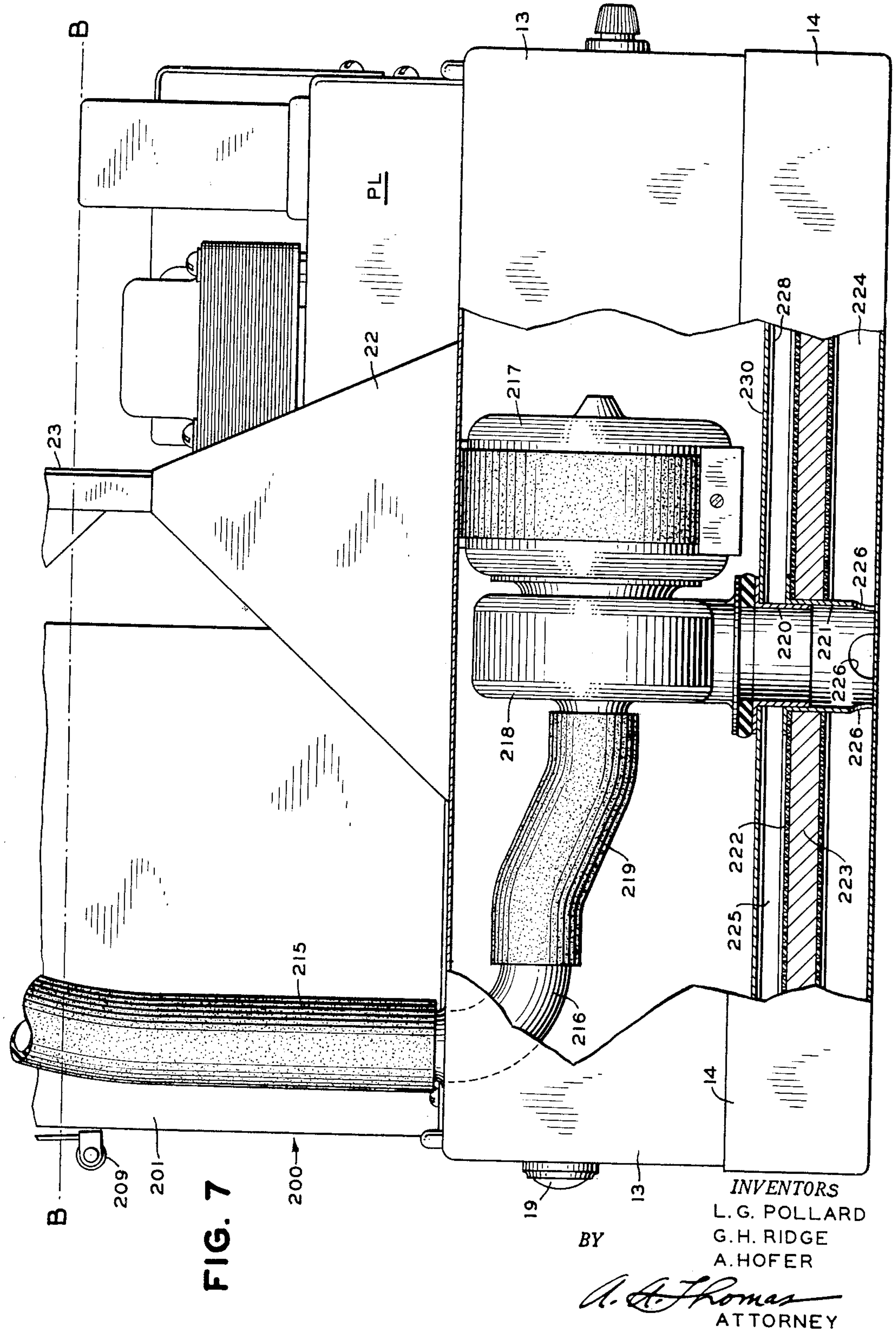
Figure 8:
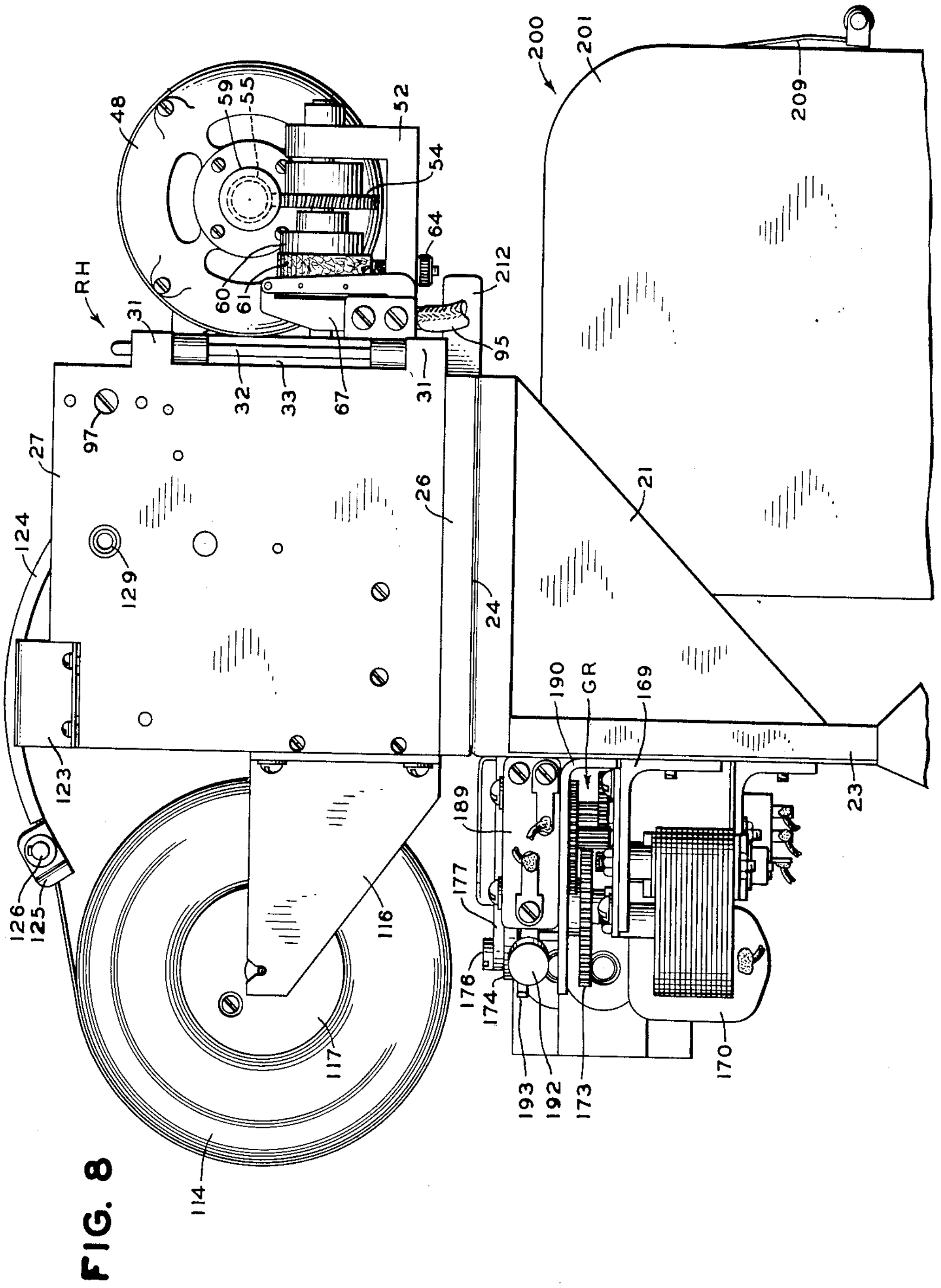
Figure 9:
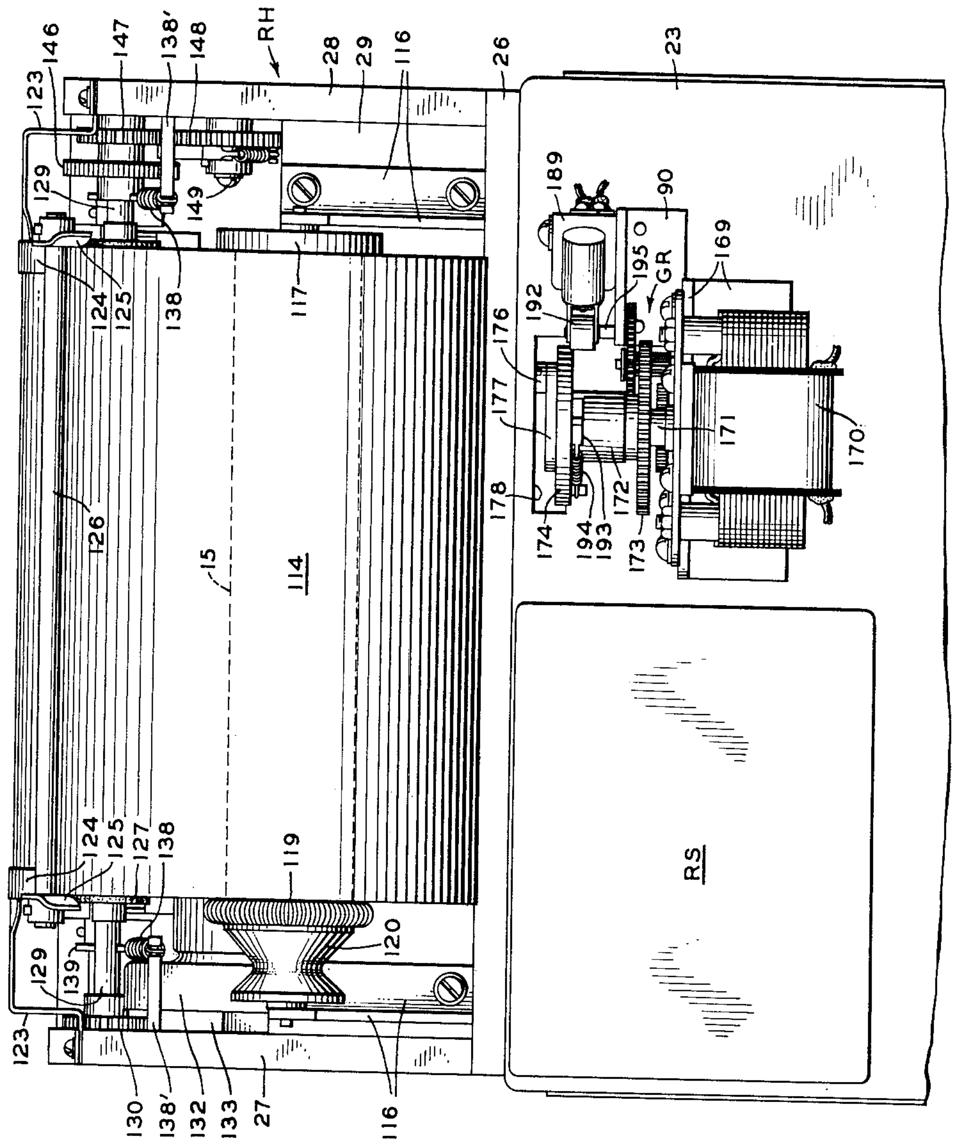
Figure 10:
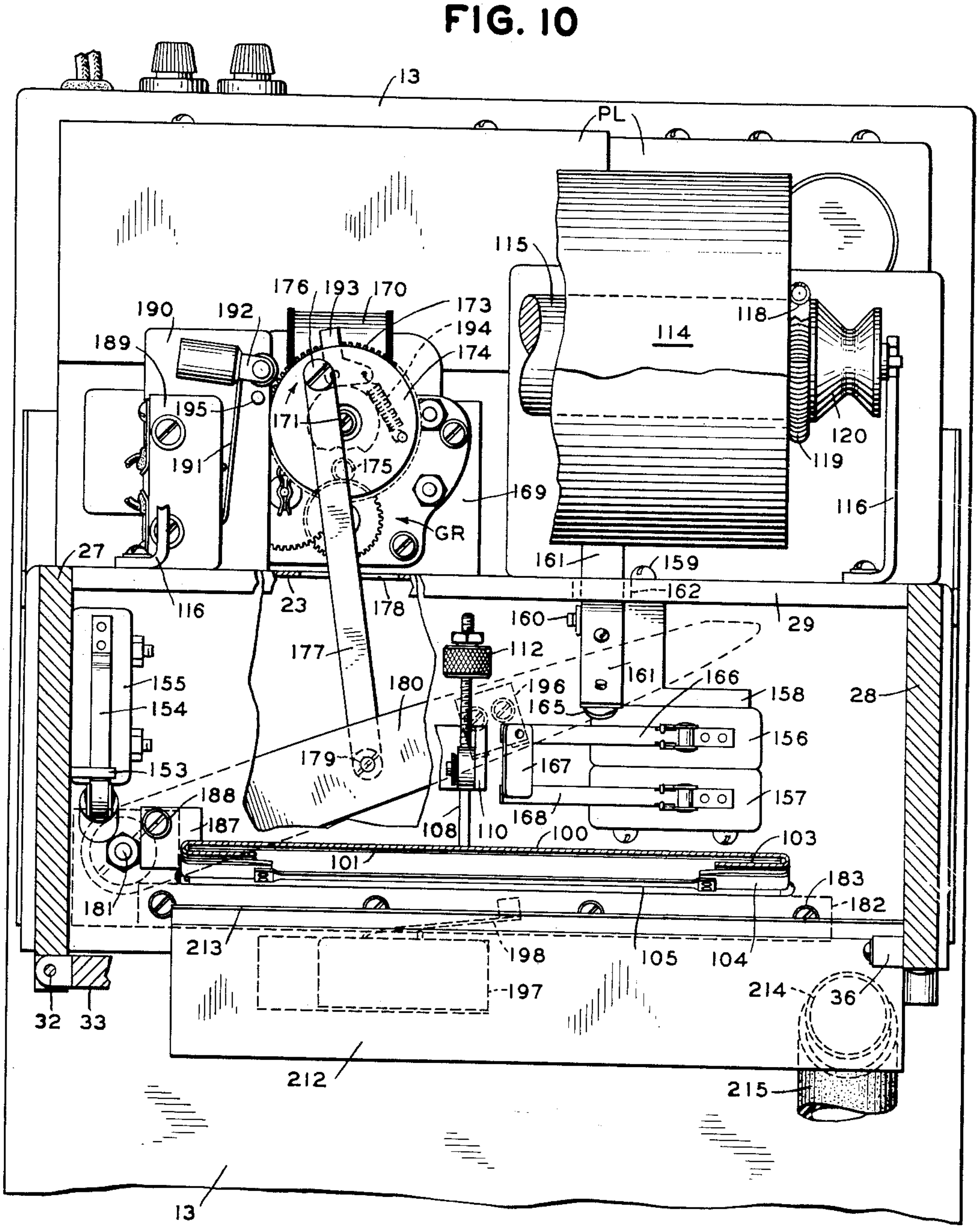
Figures 11, 12:
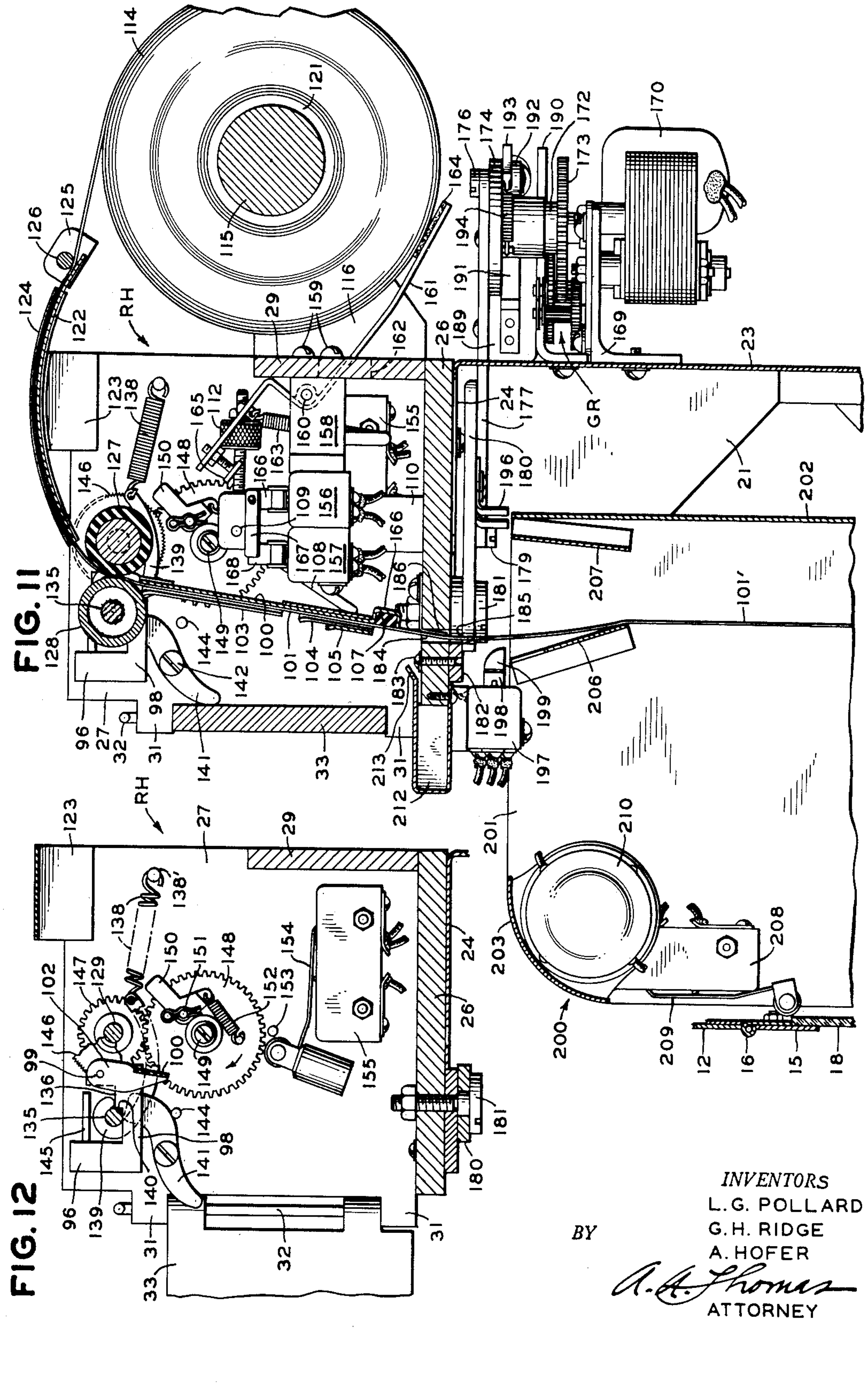
Figure 13:
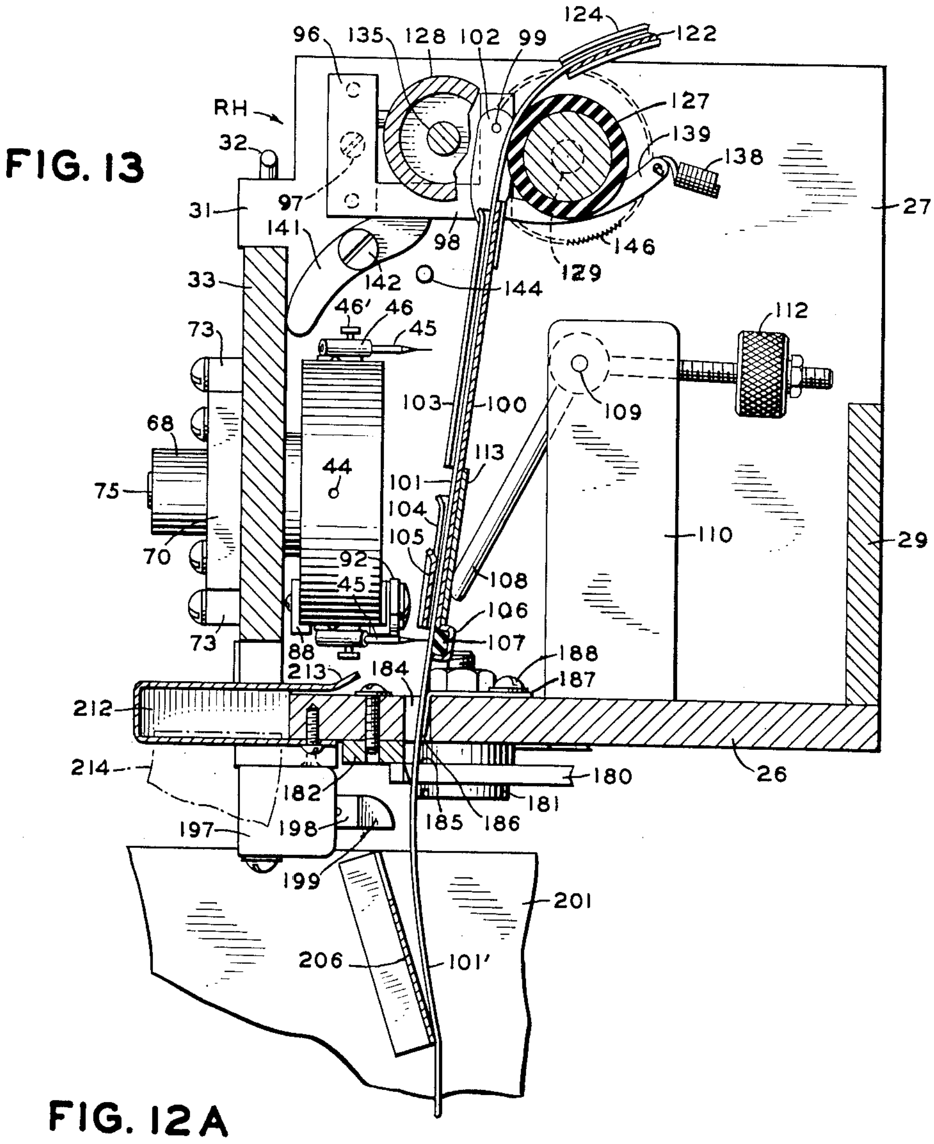
Figure 12A:
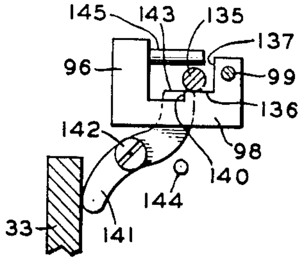
Figures 14, 15, 16, 17, 18, 19, 20:
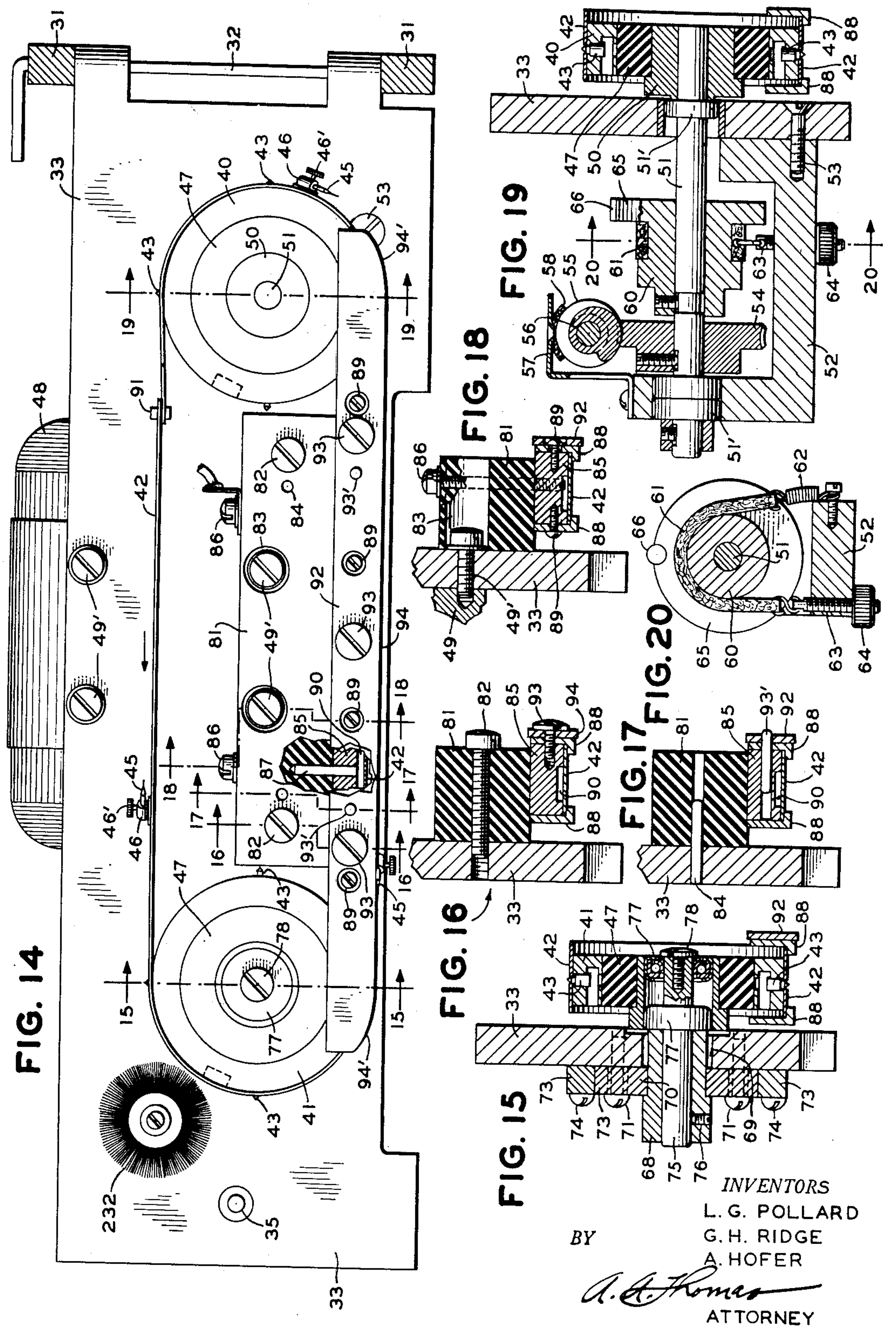
Figure 21:
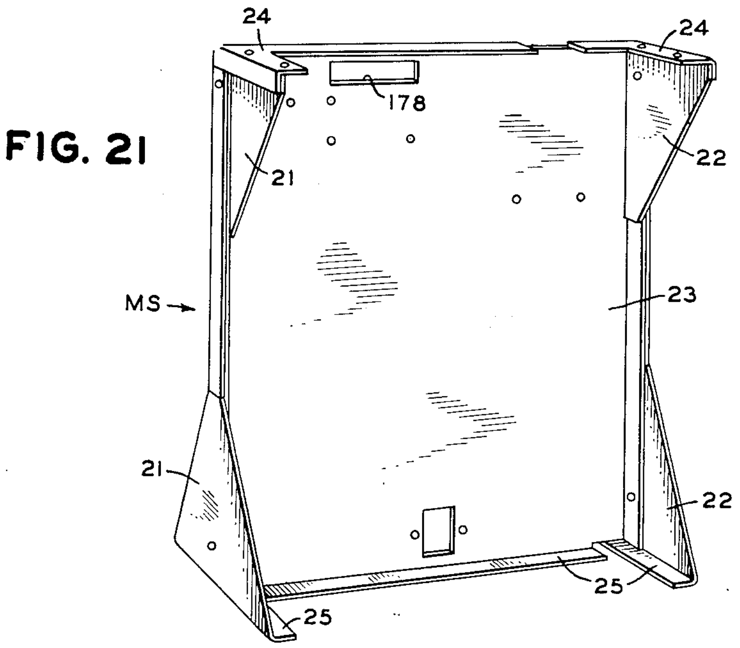
Figure 22:
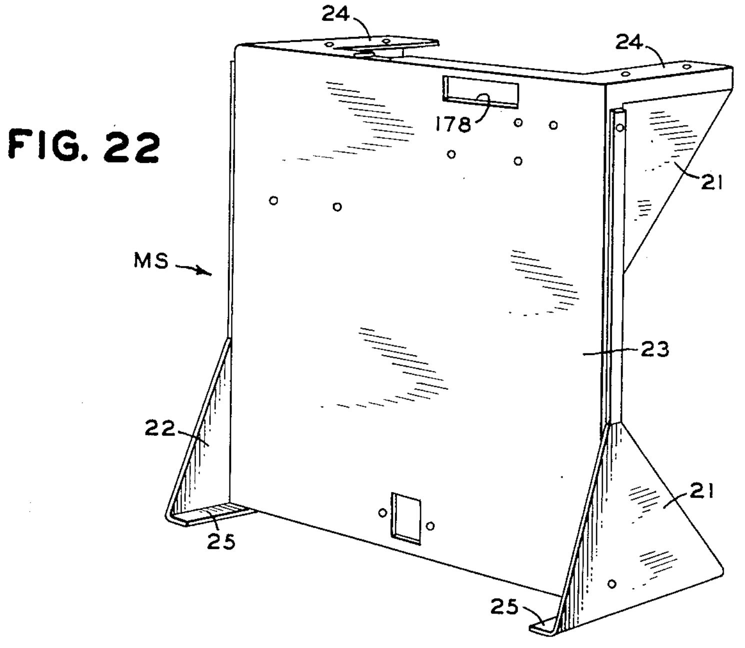
Figures 23, 24, 25:
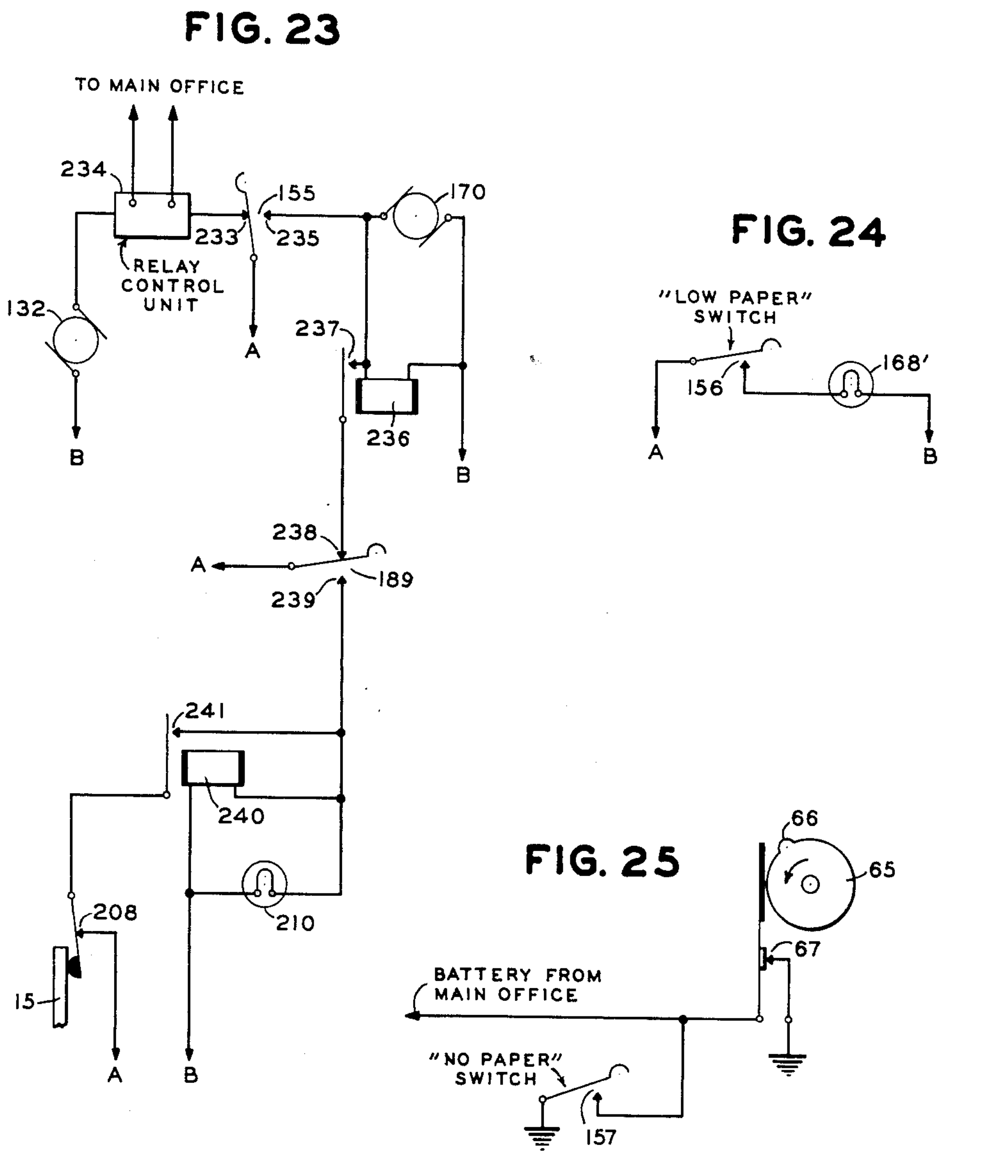

Figs. 6 and 7 together show a right end view of the machine;

Fig. 8 illustrates a left hand view of Fig. 2;

Fig. 9 is a rear view of the machine looking from left to right of Fig. 8;

Fig. 10 is a plan view in section on line 10—10 of Fig. 2;

Fig. 11 is a section on line 11—11 of Fig. 2;

Fig. 12 shows a section on line 12—12 of Fig. 5;

Fig. 12A shows a detail of Fig. 12;

Fig. 13 is similar to Fig. 11 with certain parts removed to present a clear view of the recording mechanism;

Fig. 14 is an enlarged illustration of the inner face of the recording gate;

Figs. 15 to 19 show details in section on lines 15 to 19, respectively, of Fig. 14;

Fig. 20 is a section on line 20—20 of Fig. 19;

Figs. 21 and 22 show respectively front and rear views of the main supporting stand in the machine; and Figs. 23 to 25 are circuit diagrams connected with certain switches in the machine.

Figure 1:
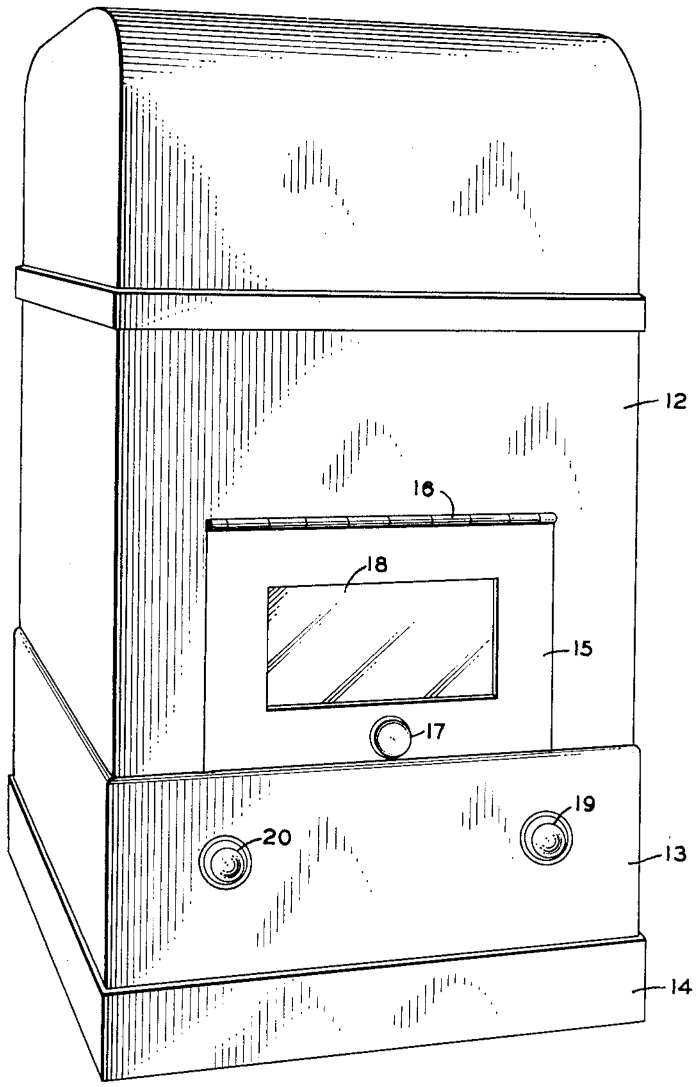
Fig. 1 shows a perspective of our machine as built for commercial use, with the outer cover in place.

Referring to Fig. 1, the machine has a cover 12 of appropriate design and color removably set upon a hollow rectangular base 13 which provides a housing for certain parts, as will appear later. The base 13 rests on a pan 14 which contains a filter device for the stylus fumes generated during a recording operation. The cover 12, usually of sheet metal, has a door 15 hinged at 16 and provided with a hand knob 17. Behind the door 15 is a compartment into which the recorded telegrams drop after being cut off. A glass panel 18 in the door enables the attendant to spot any received message. The receipt of a telegram is also indicated by a lighted jewel 19 which the attendant can see from a distance. Aside from the removal of received messages, the only attention this machine requires is the replenishing of the recording paper supply and the replacement of worn styluses. For this purpose another jewel 20 automatically lights up to warn the attendant when the paper supply is running low.

*The stylus mechanism*

The main supporting stand in the machine, shown separately in Figs. 21 and 22, is a built-up sheet-metal structure MS consisting of a pair of sides 21 and 22, a back plate 23 and a top 24 which is cut away to make room for other parts. This unitary structure is rigidly mounted on base 13 in any practical way, as by welding the bottom flanges 25 of the stand to the top of the base. Needless to say, the supporting frame MS may be of any practical construction and the particular frame shown is merely by way of example.

A recording head indicated as a unit by RH is mounted on top of frame MS and serves as a common support for the stylus mechanism, the paper holding platen, the paper feed connections and the paper cutting device. All of this apparatus will be described in proper order.

Figure 4:
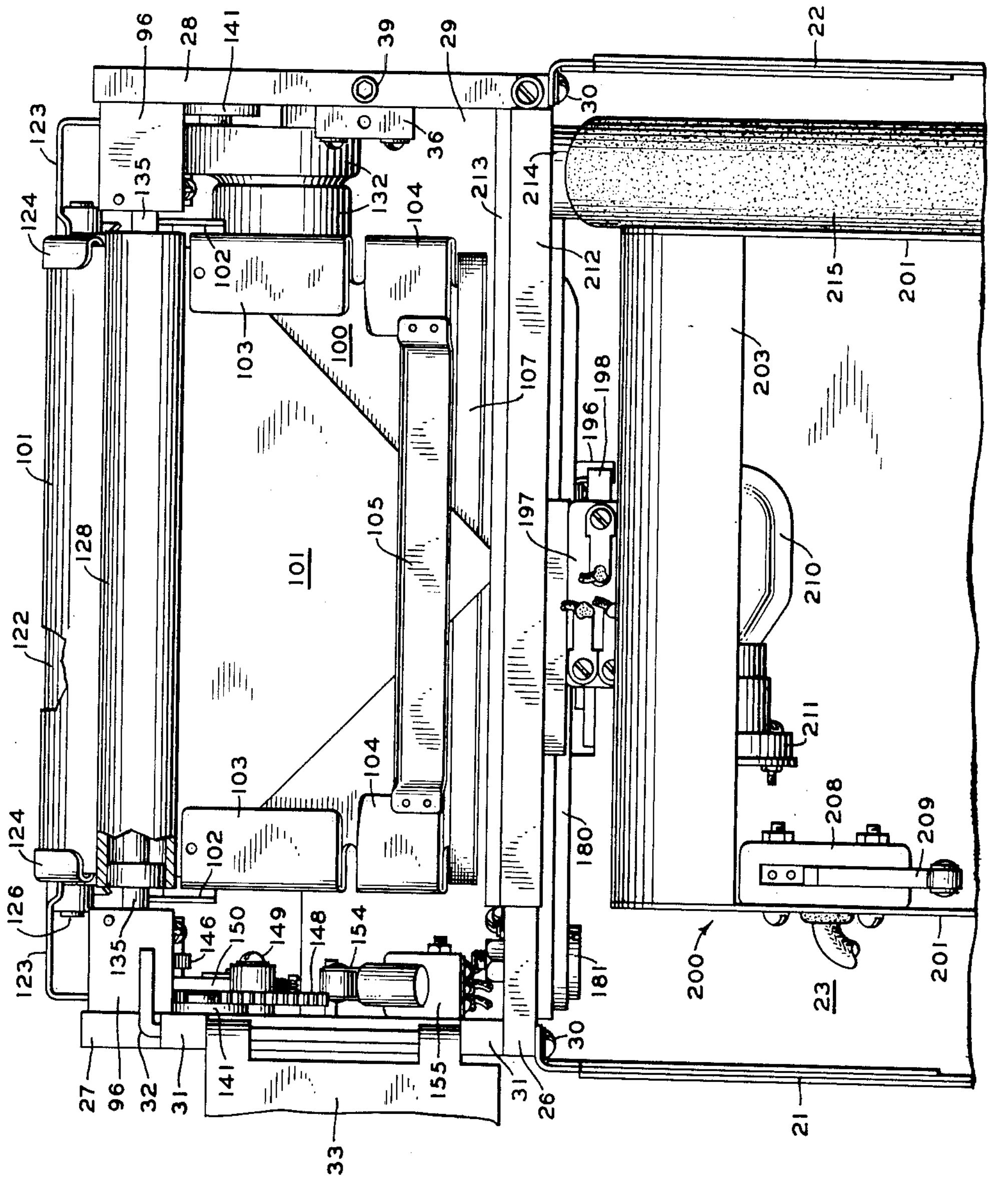
Fig. 4 shows the upper portion of the machine, with the recording gate assembly swung aside to reveal the paper supporting platen behind it.

The recording head RH is a heavy metal frame, for example, of aluminum alloy, comprising a bottom plate or base 26, a pair of vertical sides 27 and 28 and back piece 29. This rectangular construction of the recording head can be seen in Figs. 2, 4 and 9, with side views in Figs. 11 and 13. The parts 26 to 29 are secured together by screws or otherwise into a rigid structure which is fastened to the stand MS by screws 30, as shown in Figs. 2 and 4.

As seen in Figs. 2 and 12, the left hand plate 27 of the recording head is provided on the front edge with a pair of aligned lugs or ears 31 which carry a pintle 32 on which a gate 33 is hinged. The pintle 32 is easily pulled out to permit quick removal and replacing of the gate. A knurled knob 34 at the right end of gate 33 (Fig. 2A) has a screw 35 adapted to enter a nut 36 on the fixed plate 28. A collar 37 held in the gate by a set screw 38 prevents axial movement of the screw knob 34 without interferring with its rotation. When the knob 34 is turned clockwise, the screw 35 moves into the nut 36 until the gate strikes the head of an adjustable screw 39 in the edge of the plate 28. The adjustment of this screw determines the closed position of gate 33 with micrometric accuracy. The importance of this adjustment will be apparent later on.

The hinged gate 33 carries the entire stylus mechanism, as best shown in Figs. 14 to 19. Two sprocket wheels 40 and 41 are mounted on the rear or inner face of the gate and those sprocket wheels support an endless flexible steel belt 42. Each sprocket wheel has a number of pins 43, in this case four, arranged to engage sprocket holes 44 in the belt (Fig. 5) to form a positive drive connection between the sprocket wheels and the belt.

A number of recording styluses 45, in this case three, are mounted on the steel belt 42 by means of holders 46 which are rigidly anchored to the belt at equal distances in accurate positions. Each stylus is removably clamped in its holder by means of a set screw 46' (like a phonograph needle) and firmly held at a trailing angle. Since the belt and the styluses must be insulated from the metal framework of the machine, the outer metal rim of each pulley is supported on an insulated collar or bushing 47.

In the present machine, the sprocket wheel 40 is the drive sprocket wheel which is operatively connected with a synchronous motor 48 mounted on the outer or front face of the gate 33 by a suitable bracket 49 (Fig. 5), which is fastened to the gate by screws 49' (Fig. 14). The driving connections between sprocket wheel 40 and motor 48 are shown in Figs. 5, 19 and 20. The pulley 40 has a metal hub 50 which is fixed on the inner end of a shaft 51, as by a forced fit or a spline, and the front end of this shaft is journaled in a U-shaped bracket 52 attached to the gate 33 by screws 53. A worm wheel 54 (preferably of insulating material like Bakelite) is fixed on shaft 51 and meshes with a worm 55 on the shaft 56 of motor 48. In the present machine, the gear ratio between the motor shaft 56 and the pulley shaft 51 is such that the stylus belt 42 operates at 180 R. P. M. A sheet metal plate 57 secured to the bracket 52 holds an oil pad 58 against the worm 55. The motor shaft 56 is preferably provided with a knurled button 59 to permit adjustment of the stylus belt 42 by hand when necessary.

Referring to Figs. 19 and 20, the pulley drive shaft 51 has fixed thereon a hub or collar 60 formed with an annular groove in which a friction band 61 of felt or leather is held in pressure contact by a spring 62. A screw 63 is operated by a thumb nut 64 to permit adjustment of the band 61 for the required brake effect to be placed on shaft 51 as a constant load for holding the gear members 54 and 55 in firm steady engagement. The hub 60 is formed on its inner end with a disk 65 which has a cam tooth 66 on its periphery arranged to operate a switch 67 mounted on the gate 33 (Figs. 2 and 5). The switch 67 is opened briefly once for each revolution of the drive shaft 51; that is to say, once for each complete turn of the belt sprocket wheels 40—41. The purpose of switch 67 is to produce battery pulses at the main office for phasing the recorder with the connected main office transmitter at the start of each message cycle. The phasing circuits controlled by switch 67 are not a part of this invention and therefore have not been shown in the drawings.

The idler sprocket wheel 41 is slightly adjustable lengthwise of belt 42 in order to tighten the belt to the proper degree of tautness as well as to loosen the belt for removal when required. This adjustment of sprocket wheel 41 is effected by a novel mounting shown in Figs. 2 and 15. A cylindrical bushing 68 passes through a hole 69 in the recording gate 33, this hole being slightly larger than the bushing. A heavy rectangular plate 70 is mounted on bushing 68 in a forced fit and screws 71 pass through holes 72 in the plate into screw-threaded engagement with gate 33. The holes 72 are not screw-threaded and are slightly larger than the screws 71, so that a slightly horizontal adjustment of the plate 70 (and with it the sleeve 68) is permissible. The plate 70 is held against vertical movement by a pair of guide pieces 73 secured to the gate 33 by screws 74.

The bushing 68 supports a stub shaft 75 which is secured in place by a set screw 76 and does not rotate. The inner end of shaft 75 carries ball bearings 77 on which the sprocket wheel 41 is supported. A headed screw 78 locks the pulley 41 in place. The bushing 68 and plate 70 constitute a unitary support for the idle sprocket wheel 41 for linear adjustment thereof toward and from the drive sprocket wheel 40. The adjustment of plate 70 is effected by means of a screw bolt 79 which passes through a fixed bar 80 on gate 33 into screw-threaded engagement with the plate 70. To adjust this plate it is only necessary to loosen the screws 71 slightly and turn the bolt 79 in one direction or the other, to loosen or tighten the belt 42, as required. The plate 70 stays locked in either adjusted position. The adjustment screw 79 may be replaced by a fixed stop 80' in bar 80 for the plate 70 (Fig. 2C).

Referring to Fig. 14 and the associated detail views, an elongated block 81 of insulating material is fastened by screws 82 to the inner face of gate 33 between the sprocket wheels 40 and 41. Holes 83 in the block allow room for the two lower screws 49' that secure the motor 48 to the gate. The block 81 is readily located in position by pins 84 on gate 33 (Fig. 17). A channeled bar 85 of metal is rigidly attached to the underside of insulating block 81 by screws 86, one of which serves as a binding post to connect the insulated bar in the stylus circuit. One or more pins 87 (Fig. 14) locate the bar 85 in position for the screws 86. The bar 85 is provided with flanged side strips 88 which are attached by screws 89. The flanged strips 88 are slightly spaced from the bottom of bar 85 to provide narrow grooves or channels for the sides of the stylus belt 42, which is thereby supported and guided along the bar in its lower run between the pulleys 40 and 41. The guide bar 85 has a channel 90 to clear the rivet 91 (Fig. 14) that holds the overlapped ends of the belt together.

The bar 85 carries a long steel rail 92 which is secured in place by screws 93, and pins 93' in bar 85 locate the rail in correct position. The rail 92 has a straight bottom edge 94 with upwardly bevelled ends 94' for easy riding of the styluses onto and off the rail. As seen in Figs. 15 to 18, the straight bottom edge 94 of the rail projects slightly below the adjacent side strip 88 of bar 85 so as to be engaged in pressure contact by each stylus during its scanning movement. This pressure contact is due to the fact that, as each stylus encounters the fixed rail 92 and rides under it, the spring belt 42 is slightly twisted or distorted transversely and thereby holds the stylus in pressure contact with the edge of the rail. As a result, the styluses travel the same recording path across the paper and produce uniformly spaced lines of recording. For this reason the rail 92 has been called an anti-grouping bar, since it prevents grouping or bunching of the scanning lines.

The above described guide structure for the belt and styluses is like that set forth in the pending application of Hallden and Zabriskie, Serial No. 83,333, filed March 25, 1949. In that case the guide rail is arranged along the upper loop or run of the belt where the recording takes place from left to right as the paper moves up. In the present machine the recording is done by the stylus on the lower run of the belt from right to left as the paper moves down. These differences in structure and operation are part of the present invention, but we do not claim broadly the idea of causing the lateral flexure of belt 42 to hold the styluses 45 in pressure contact with the fixed rail 92 during their recording movements. This basic concept belongs in the Hallden and Zabriskie application referred to.

Let it be noted that the hinged gate assembly—that is, the gate 33 and all the parts mounted thereon—is a unitary structure capable of quick replacement when necessary. All electrical connections to the gate are carried by a short cable 95 (Figs. 2 and 5) which has a terminal plug 95' inserted in a socket on the base of the machine. By simply pulling out the plug 95' and lifting out the hinged pin 32, the gate assembly is free to be removed and another one can be quickly put in its place. This rapid interchange of gates makes it possible to keep the machine in running order without waiting for repairs in the event of failure in the recording mechanism.

*The platen and paper feed mechanism*

Referring to Figs. 5, 12, 12A, and 13, the side plates 27 and 28 of the recording head RH carry a pair of heavy U-shaped brackets 96 which are secured thereto by screws 97. Each bracket 96 has a rear extension 98 which carries a pivot pin 99 for suspending a platen 100 adapted to support a sheet of paper 101 in scanning position.

As seen in Figs. 4 and 13, the platen 100 is a rectangular sheet metal plate (preferably of aluminum) formed with upstanding ears 102 for receiving the pivot pins 99 and turned inward along the sides to provide spaced flanges 103 and 104. These flanges form shallow channels which are just deep enough to receive the sides of the paper sheet in an easy fit so as to hold it flat against the platen during the downward travel of the paper. A cross bar 105 is riveted to the lower pair of flanges 104 to hold the paper close to the platen at the scanning line. The member 105 also serves as a guide for the tapered end of the paper when a new roll is inserted.

The lower edge 106 of platen 100 (Figs. 11 and 13) is offset rearward to provide a groove or channel in which a strip 107 of hard insulating material (such as Bakelite) is firmly seated to provide a solid backing for the moving paper along the recording track of the styluses 45. Another practical advantage of the insulating strip 107 lies in the fact that no deposit of particles accumulates thereon from the stylus operation, as would be liable to happen if the strip were of metal. The ends of strip 107 are curved rearward at the sides and also curved backward at the top toward the platen, as indicated by the double shading in Fig. 4. This double curvature allows the fast moving stylus points to ride smoothly onto the surface of the paper at the beginning of the scanning stroke and to recede gradually at the end of the stroke.

The floating platen 100 is constantly being pushed forward by a weighted arm 108 (Fig. 13) pivoted at 109 on a stand 110 which rises from the base 26 of the scanning head. The arm 108 carries an adjustable weight 112 for regulating the pressure of the arm against the platen. The lower end of arm 108 is not connected to the platen but is merely in sliding contact with a hard steel plate 113 attached to the platen back. The weighted arm 108 constantly holds the paper against the recording stylus points with the right degree of pressure.

The paper is fed downward through the platen in a continuous sheet from a supply roll 114 mounted on a roller 115 (Fig. 5) which rests at its pivot ends in a pair of brackets 116 secured in the rear plate 29 of the scanning head RH (Figs. 6 and 8). One end of roller 115 (usually of wood) has a metal retaining disk 117 and the other end of the roller has a circular groove 118 (Fig. 10) for holding a spring garter 119 which can be easily rolled out of the way onto a neck 120 of the roller to permit withdrawal of an exhausted paper core 121 and the insertion of a fresh supply roll. This construction of roller 115 is not a part of our invention, being disclosed in the pending application of Hallden and Zabriskie, already identified.

Referring to Figs. 6, 8 and 11, the paper passes upward from the supply roll 114 over a fixed guide bridge 122 which is carried by a pair of brackets 123 mounted on the side plates 27 and 28 of the recording head. The guide bridge 122 is an arched piece of sheet metal provided with side flanges 124 and a pair of ears 125 which support a rod 126. The paper passes under the rod 126 onto the bridge and the sides of the paper pass through the shallow channels provided by the flanges 124, which cause the moving sheet to follow the smooth curved surface of the bridge.

The paper is fed out of the supply roll 114 by means of a pair of rollers 127 and 128. The roller 127 is a rubber covered feed roller operated by a synchronous motor, and the roller 128 is a metal idler held in pressure contact with the feed roller. As shown in Fig. 11, these two rollers are arranged to receive the paper as it leaves the guide bridge 122 and to push it downward over the platen 100. The rollers 127 and 128 are mounted independently of each other so that the idler 127 can be adjusted laterally with respect to the feed roller, as will presently be described.

The feed roller 127 is fixed on a shaft 129 which is journaled in the side plates 27 and 28 of the recording head RH. A gear 130 (Figs. 5 and 9) secured on the right end of shaft 129 meshes with a pinion 131 on the shaft of a small synchronous motor 132 mounted on the side plate 28 by means of a cross bar 133 which is secured by screws 134 (Fig. 6). The reduction gear ratio between the motor 132 and the feed roller 127 is such that the paper is pushed down over the platen in a slow continuous movement at the rate, for example, of 0.01 inch per stylus scanning stroke.

The idle roller 128 has a shaft 135 extending loosely therethrough at both ends and this shaft is adjustably supported on the brackets 96 (Figs. 12 and 12A). In the normal sheet feeding position of the roller 128, the shaft 135 rests at each end on a raised ledge 136 of the bracket arm 98 without touching the rear edge 137 of the bracket arm. This slight clearance is necessary to hold the roller 128 in floating position against the elastic surface of the feed roller 127. The idler 128 is held against the feed roller by a pair of contractile springs 138 (Figs. 5 and 12) connected to links 139 which hook over the shaft 135. The rear ends of springs 138 are attached to pins 138' carried by the side plates 27 and 28.

The spring hook connections 138—139 allows the idler 128 to be pulled forward by hand for the insertion of a new sheet. When the idler 128 is moved forward, the shaft 135 snaps down automatically at each end against the shoulder 140 (Fig. 12) where it is held by the spring 138. In other words, the idler 128 is now kept away from the feed roller 127, so that it is easy to thread a new sheet from the supply roll 114 over the guide bridge 122, past the roller 127 and down through the side channels of the platen 100.

The idler 128, however, can not be moved forward unless the hinged gate 33 is swung open, which must be done to get access to the platen when a new sheet is to be inserted. When the gate 33 is in closed or recording position, as shown in Figs. 12, 12A and 13, the idler shaft 135 is prevented from dropping against the retaining shoulders 140 of the brackets 96 by means of a pair of dogs 141 pivoted on the side plates 27 and 28 of the scanning head by screws 142.

As best shown in Fig. 12A, the closed gate 33 engages the lower ends of the dogs 141 and thereby holds their flat upper ends 143 in line with the supporting ledge 136, so that the shaft 135 can not engage the shoulders 140. When the gate 33 is opened, the released dogs 141 drop by gravity against stops 144 into the position shown in Fig. 12, leaving the shoulders 140 of the bracket arms 98 clear of the upper ends 143 of the dogs. The idler 128 can now be moved forward and it will be held in that position by the shaft 135 snapping against the retaining shoulders 140. The mere closing of the gate 33 rocks the dogs 141 upward to lift the shaft 135 off the shoulders 140, whereby the idler returns automatically to sheet feeding position, as shown in Fig. 11. Retaining pins 145 on the brackets 96 prevent accidental lifting of the roller 128 too far.

Referring to Figs. 5, 9 and 12, the left end of the feed roller shaft 129 (the right end in the rear view of Fig. 9) carries a knurled handwheel 146 of insulating material and a gear 147, both of these wheels being fixed on the shaft. The wheel 146 is used to feed the paper by hand when necessary, as when putting in a new sheet. The gear 147 meshes with a larger gear 148 which is mounted on the adjacent side plate 27 by means of a pin or stud 149.

As best shown in Fig. 12, the large gear 148 carries a bell crank 150 pivoted on a pin 151. A contractile spring 152 holds the bell crank in the position shown in Fig. 12. A fixed stop 153 in plate 27 is in the path of the projecting end of bell crank 150. Therefore, when the bell crank strikes the stop 153, the continued slow rotation of gear 148 in a clockwise direction causes the stop to rock the bell crank against the tension of spring 152. The instant that the bell crank is carried by the gear 148 past the stop 153, the tensioned spring 152 snaps the bell crank forward into momentary impact with the weighted free end of a spring arm 154. This arm operates a flip switch 155 secured to the side plate 27.

The switch 155 is called the end-of-message switch because it is operated at the close of a message recording cycle to stop the motor 132 after a prescribed length of paper has been fed past the roller 127. The diameter of this roller and the transmission ratio of gears 147 and 148 are so related that for one revolution of gear 148 the roller 127 feeds out the standard length (at present, four and five-eighths inches) of a Western Union telegram sheet. Therefore, the operation of switch 155 by the gear 148 occurs only after a uniform length of paper has been fed through the platen 100 in a recording cycle. Another function of switch 155 is to set the paper cutting mechanism in operation simultaneously with the stopping of the paper feed motor 132. This will be fully explained in the circuit diagram of Fig. 23.

In connection with the paper feed mechanism, we provide automatic signal means for indicating when the paper in the supply roll 114 is getting low, then indicating when the paper is exhausted. Referring to Figs. 10 and 11, two microswitches 156 and 157 are mounted side by side on an angle bracket 158 which is secured by screws 159 to the rear plate 29 of the recording head RH. The bracket 158 carries a pin 160 for pivotally supporting a long lever 161 which extends rearward through a vertical slot 162 in plate 29. A contractile spring 163 holds the rear end of lever 161 in continuous pressure contact with the paper supply roll 114. A cushion 164 of felt or the like is preferably attached to the end of lever 161 for smooth sliding contact with the paper. As the size of the paper roll decreases, the lever 161 acts as a follower and swings counterclockwise, as viewed in Fig. 11.

The inner end of lever 161 carries an adjustable button 165 arranged to engage the operating arm 166 of switch 156 when the paper supply has reached a predetermined low point. The switch arm 166 carries a cross-piece 167 which overlies the arm 168 of switch 157. The switch arm 168 is so adjusted that when the supply of paper is exhausted (that is, not enough left for the next recording), the cross-piece 167 operates the arm to close the switch 157. It will thus be seen that the "low paper" switch 156 and the "no paper" switch 157 are automatically operated in that order by the paper controlled lever 161. When the "low paper" switch is closed, it lights a lamp 168' (Fig. 24) that shines through the jewel 20 at the front of the machine. The operation of the "no paper" switch 157 disables the machine in a manner to be explained later.

*The paper cutting mechanism (Figs. 8 to 11)*

The rear wall 23 of the supporting stand MS carries an angle bracket 169 to which a small A. C. motor 170 is secured with its shaft vertical. A stud 171 fixed on top of bracket 169 supports a rotary sleeve or hub 172 which has a gear 173 secured on its lower end and a crank 174 on its upper end (Fig. 9). Between the motor pinion 175 (Fig. 10) and the gear 173 is a speed reduction train GR calculated to turn the crank 174 at the required low speed.

The crank 174 carries an eccentric pin 176 on which is pivoted the rear end of a link or rod 177 arranged to extend forward through an opening 178 in the plate 23. The front end of rod 177 is pivoted to the stud 179 of a knife blade 180 which is pivotally mounted at one end on a vertical pin 181 secured to the base 26 of the scanning head (Fig. 12). It is clear from Fig. 10 that during the forward movement of crank pin 176 for a half revolution of disk 174 the rod 177 pushes the knife 180 forward and during the receding movement of the crank pin the knife is withdrawn. A fixed knife blade 182 (Figs. 10 and 11) is fastened to the underside of the base plate 26 by screws 183 in shearing relation to the movable knife 180.

Referring to Figs. 11 and 13, the base plate 26 has a longitudinal slot 184 in line with the lower edge of the platen 100, so that the paper 101 passes freely from the platen through the slot 184 into a lower compartment of the machine. The recorded section 101' of the paper is cut off by the knife 180 along a horizontal line indicated at the point 185. Since the knife 180 starts cutting the paper at the left end (Fig. 10), we found it desirable to provide a slanting tongue 186 in the left end of slot 184. This slanting tongue (Fig. 11) is a guide to keep the left edge of the message sheet from catching on the knife 180, which in its normal or rest position does not quite clear the back edge of the left end of slot 184. The guide tongue 186 may be an integral extension of a small sheet metal plate 187 secured on base plate 26 by a screw 188 (Fig. 10).

Still referring to Figs. 8 to 11, there is a microswitch 189, usually called a flip switch, mounted on an angle bracket 190 which is attached to the rear plate 23 of the stand MS. This switch has an operating arm 191 of spring metal provided with a weighted end 192. The disk 174 carries on its underside a pivoted bell crank 193 which is normally held by a contractile spring 194 in such position that the outer end of the bell crank projects beyond the disk. As the knife 180 nears the end of its return movement, the bell crank 193 encounters a fixed stop 195 which temporarily holds the bell crank back against the tension of spring 194. When the bell crank snaps out of engagement with stop 195, it strikes the end of switch arm 191 which momentarily opens the switch 189 to break the circuit of the knife motor 170 and simultaneously energizes a signal circuit. This will be explained more fully in Fig. 23.

As shown in Fig. 11, the knife 180 carries on its underside a two-pronged bracket 196 adapted to operate a microswitch 197 when the knife in its forward movement encounters a sheet of paper. The switch 197 has an operating arm 198 with its end 199 arranged to be bridged by the spaced prongs 196 when there is no paper in the path of the knife. Under those conditions, the switch 197 will not be operated. However, when the recorded message 101 hangs down ready for cutting off, the forward swing of the knife 180 pushes the prongs 196 against the paper which is sufficiently stiff to operate the switch arm 198.

The circuits controlled by switch 197, which we call the message finder switch, are not a part of this invention and belong to the two-way facsimile system disclosed in the pending application of G. H. Ridings, Serial No. 178,815, filed August 11, 1950. It is enough to say here that the operation of switch 197 by the knife 180 through the medium of the recorded sheet brings up a signal light at the main office to inform the operator that the transmitted message has been recorded and cut off. The failure of switch 197 to operate at the end of the cutting cycle tells the central operator that the paper in the recorder has failed to feed properly and that the transmitted message has not been recorded.

*Compartment for received messages*

Figure 3:
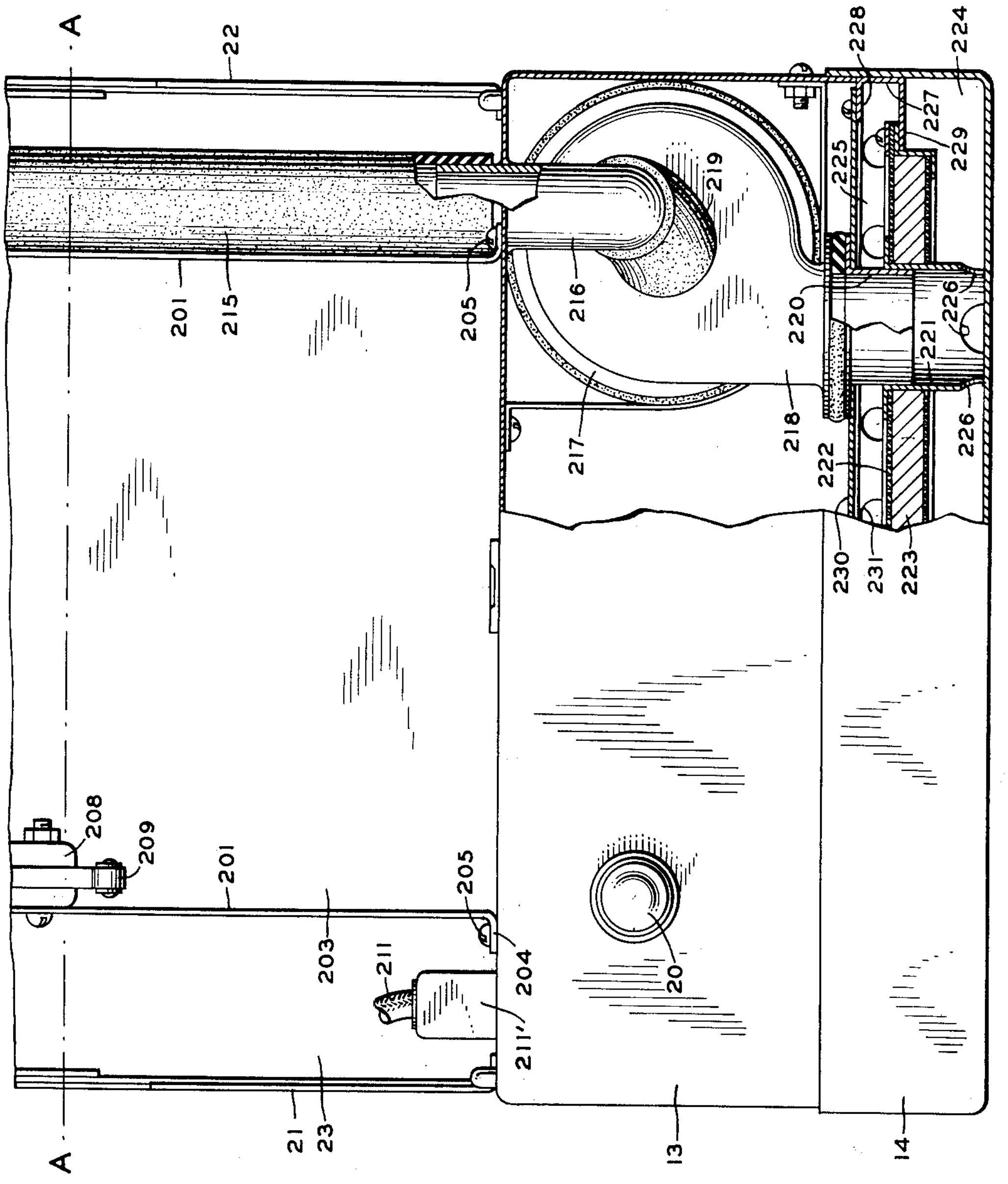
Fig. 3 is a downward continuation of Fig. 2, showing the lower half of the machine, with certain parts in section.

From what we said previously about the function of the end-of-message switch 155, it is clear that the message sheets cut off by the knife 180 have all the same length regardless of the amount of text they contain. The cut-off messages drop to the bottom of a compartment formed by a sheet metal casing 200 rising from the base 13 (Figs. 2, 3 and 11). This casing comprises a pair of sides 201, a back 202 and a curved front piece 203 on top, the rest of the top being open (Fig. 11). The sides 201 have bottom flanges 204 (Fig. 3) which are secured to the base 13 by screws 205. A slanting cross strip 206 secured to the sides 201 near the top (Figs. 11 and 13) serves as a guide for the message sheet 101' that hangs down into the casing ready for cutting. A second cross strip 207 may be put in to prevent a person from touching the knife 180 with his finger tips.

A normally open switch 208 is attached to one of the sides 201 and this switch has a spring arm 209 which is pressed into circuit closing position by the closed door 15 of the outer casing 12 (Fig. 11). The switch 208 is in the circuit of a lamp 210 secured within casing 200 to the top piece 203, and this lamp will automatically light whenever a message is received. When the attendant opens the door 15 to take out the message, the switch 208 releases and disconnects the lamp 210. The circuit for this operation will be described in Fig. 23.

To permit easy mounting and removal of casing 200 as a unit, the electrical connections that go to switch 208 for lamp 210 are contained in a short cable 211 which has a terminal plug 211' (Figs. 3 and 5) inserted in a socket on the base of the machine. By pulling out the plug 211 and taking out the screws 205, the message casing 200 is free to be removed when necessary.

*The fume removing apparatus*

It is generally known that in a facsimile recorder using an electric stylus on a special kind of recording paper, the contact of the stylus with the paper generates smoke or fumes which it is desirable to deodorize. While fume removers or deodorizers have been used before in facsimile recorders, we have provided the present machine with novel apparatus for that purpose.

As shown in Figs. 11 and 13, a channel 212 is secured to the front edge of the base plate 26 and forms a ventilating duct along the scanning path of the stylus. The upper end of channel 212 is slightly spaced from the base 26 and preferably terminates in an upturned lip 213 to provide an easier entry for the stylus fumes into the channel. The right end of this channel is open at the bottom to a nipple 214 to which a flexible rubber pipe 215 is connected (Figs. 2 and 6).

Referring to Figs. 3 and 7, the lower end of pipe 215 is joined to an elbow 216 extending upward from the hollow base 13 which forms a housing for a blower unit consisting of a motor 217 and an exhaust fan casing 218. A flexible tube 219 connects the elbow 216 to the inlet of the fan casing. The exhaust outlet 220 of this casing extends into the pan 14 where it connects with a pipe 221 of a foraminous tray 222 which contains a suitable filter medium 223 such as charcoal. The tray 222 forms a partition which divides the pan 14 into a lower chamber 224 and an upper chamber 225. The pipe 221 has holes 226 through which the chamber 224 communicates with the exhaust outlet of the blower.

As shown in Fig. 3, the pan 14 is provided inside with a rectangular channeled frame 227 secured in place by screws or welding, and this frame has a narrow upper flange 228 and a wider lower flange 229. These flanges preferably run along the four sides of the pan and thereby constitute two rectangular supporting ledges. A cover plate 230 is situated on the upper ledge 228 and the filter tray 222 rests on the lower ledge 229. The tray 222 and the cover 230 are held in place by screws so as to be easily removable. When the cover 230 is taken off, the filter tray 222 can be lifted out past the narrow ledge 228. In this way the filter is easily replaced by a fresh one when necessary.

In the operation of the blower unit 217—218, the underpressure created in channel 212 sucks the fumes or smoke appearing at the stylus points into the channel, whence they are drawn through the pipe 215 into the fan casing and through the holes 226 into the fan chamber 224. From here the fumes are forced through the filter tray 222 which absorbs them and the smoke-free air passes from chamber 225 through holes 231 (Fig. 3) into the open.

*Operation of the machine*

Assuming that the belt drive motor 48 and the paper feed motor 132 are running, the styluses 45 on the lower loop of belt 42 sweep in succession across the paper 101 in platen 100, each stylus making one line of recording from right to left. The fixed guide rail 92 insures the even spacing of the successive lines made by the styluses. The paper is fed down at a rate that gives the required number of lines to the inch, usually one hundred. For this purpose, the motor 132 runs at one revolution per minute. The spacing of the styluses is such that as one stylus leaves the paper at the left hand side, the next stylus engages the paper at the right hand side.

As each stylus moves down over the idle pulley 41 on the right, it strikes a rotary bristle brush 232 (Fig. 14) which knocks off any particles clinging to the stylus, so that each stylus enters upon the paper with a clean point. The platen 100 is so hung that the styluses on the upper run of the belt are clear of the paper (Fig. 13). The position of the gate 33 is so adjusted by means of the screw 39 (Fig. 2A) that the engagement of the styluses with the paper causes only a very small movement of the platen at each scanning stroke, and this slight movement of the platen is allowable because of the compensating action of the weighted arm 108 in the rear of the platen. In other words, the scanning plane of the stylus points is so adjusted with respect to the paper surface that only a minimum of platen bounce results as one stylus is about to leave the paper and the other makes contact with it.

Since the recording is done from right to left on the downwardly moving paper, the record thus made is upside down on the hanging sheet before it is cut off. This arrangement permits the mounting of the knife 180 below the recording head so that the cut-off sheets can drop into the casing 200 for easy removal through the front door 15. This practical advantage is not present in those prior page type stylus recorders where the paper is moved up and the recording is from the conventional left to right.

When the proper length of paper has been fed out during a recording cycle, the switch 155 is automatically operated by the timing gear 148 (Fig. 12) to stop the paper feed motor 132 and energize the knife motor 170. The hanging message 101' is now cut off and it drops into the compartment below for removal through the door 15. When the knife 180 after cutting off the message returns to normal position, the switch 189 is operated to stop the knife motor 170 and light the lamp 210 as a signal that the illuminated compartment contains a telegram. When the door 15 is opened to remove the message, the lamp 210 goes out, and the machine is completely shut down ready for the next message from the main office.

As previously explained, when the switch 155 is operated at the close of a message cycle, it stops the paper feed motor 132 and energizes the knife motor 170. These circuits are indicated in Fig. 23 where the source of power is represented by the leads A and B which may be connected to a local 115 volt A. C. house lighting circuit. Normally the switch 155 closes the contact 233 but the paper feed motor 132 does not start operating until a certain moment as determined by special relay control circuits in the system in which this recorder is used. Those control circuits form no part of the present invention and are schematically indicated by the rectangle 234.

We are to assume in Fig. 23 that the paper feed motor 132 has been set in operation by the relay control circuits of the system. After the prescribed length of paper for a message has been fed out, the switch 155 is automatically operated to open the contact 233 and close the contact 235, whereby the circuit of the paper feed motor 132 is broken and the circuit of the knife motor 170 is closed. A relay 236 is energized simultaneously with the motor 170 and locks through its closed contacts 237 which keep the motor circuit closed through the knife switch 189 when the switch 155 flips back to normal position as shown in Fig. 23. The reclosing of contact 233 does not reenergize the paper feed motor 132 which remains inoperative until the next recording cycle begins.

When the knife switch 189 is operated by the crank 174 (Fig. 10) upon the return of knife 180, the normally closed contact 238 of switch 189 is opened and the other contact 239 is closed. As a result, the knife motor 170 and the relay 236 are deenergized and the lamp 210 lights up the compartment of the machine as a signal that a telegram has been received. A relay 240 is operated at the same time to keep the lamp circuit closed through the contacts 241 when the switch 189 goes back to normal position after its momentary operation. The lamp 210 stays on until the attendant opens the door 215 to obtain the message, whereupon the switch 208 opens and breaks the circuit of lamp 210 and relay 240.

As pointed out in connection with the switch 67 (Fig. 5), its function is to phase the recorder with the connected transmitter at the main office at the beginning of each message cycle. This phasing operation and the apparatus that accomplishes it do not belong to the present machine and so it will suffice to say that the switch 67 periodically interrupts a battery circuit at the transmitter (Fig. 25) to create the phasing pulses. When the "no paper" switch 157 is closed, it shorts out the commutator switch 67 so that no phasing pulses are generated at the transmitter and the recorder can not be connected. In other words, the exhaustion of paper automatically disables the recorder until a new supply roll has been inserted.

The drawings were made from an actual machine equipped with electrical parts provided for connecting the machine with a transmitter at the main office. Some of those parts have been shown in the drawings but it will not be necessary to describe them because they are not included in the present invention. Suffice it to mention merely that on the back of the supporting stand MS is mounted a relay assembly RS (Figs. 6 to 9), and behind the stand on base 13 is an amplifier unit PL (Fig. 7). Other electrical parts are contained in the hollow base 13 of the machine.

It will be understood that the features of novelty contained in our invention are not restricted to the structural details shown, for various changes and modifications are possible within the scope of the appended claims.

We claim as our invention:

1. In a facsimile recorder, a pair of spaced vertical plates arranged transversely of the recorder, a removable hinge pin carried by the left plate, a gate hinged on said pin, stylus recording mechanism mounted on said gate, manually operable screw means for releasably locking the right hand end of the gate to the right hand plate, a sheet holding platen supported in operative relation to said mechanism when the gate is locked, and an adjustable threaded stop mounted on the right hand plate for engaging the corresponding end of the gate when the recording mechanism is in correct alignment with said platen.

2. A facsimile recorder provided with a frame, a horizontal gate hinged to said frame and movable to open and closed positions, recording mechanism carried by said gate, a platen supported on said frame behind said gate for holding a sheet of paper in scanning position, said recording mechanism being in operative relation to said platen when the gate is closed, a pair of feed rollers carried by said frame for feeding paper downward over the platen from a continuous supply roll, one of said rollers being movable away from the other when the gate is open, means for holding said movable roller in withdrawn position for the easy insertion of paper down through the platen from a new supply roll, and means automatically actuated by the closing movement of the gate for releasing the withdrawn roller from the said holding means into feeding position.

3. In a facsimile recorder, a frame comprising a pair of spaced vertical plates arranged transversely of the recorder, a gate hinged to one of said plates and adapted to be releasably secured to the other plate so that said gate can be swung to open and closed positions, recording mechanism mounted on said gate, a depending platen supported by said frame for holding a sheet of paper in scanning relation to said mechanism when the gate is closed, a pair of feed rollers carried by said frame for feeding paper downward through the platen from a continuous supply roll, one of said rollers being movable away from the other when the gate is open, means for holding said movable roller in withdrawn position, a pair of members mounted on said plates in operative relation to said movable roller, and means whereby said gate when closed automatically actuates said members to release the withdrawn roller for return to paper feeding position.

4. In a facsimile recorder, the combination of a recording device having a plurality of styluses that travel successively in a flat fixed scanning path from right to left, a sheet metal platen hinged at the top and hanging down in a floating position to hold a sheet of paper for scanning, an insulating strip mounted on the lower edge of the platen in line with the stylus scanning path, a floating weighted arm pressing continuously against the back of the platen to urge the same toward the styluses which thereby make positive recording contact with the paper, said insulating strip back of the paper holding the same firmly against the scanning track of the stylus, and means for feeding a definite length of paper from a continuous supply roll downward over the platen during a recording cycle.

5. In a facsimile recorder, the combination of a recording device having a plurality of styluses that travel successively in a fixed scanning path from right to left, a platen hinged at the top and hanging down in a floating position to hold a sheet of paper for scanning, a floating weighted arm pressing continuously against the back of the platen to urge the same forward against the styluses which thereby make positive recording contact with the paper, means for feeding a definite length of paper from a continuous supply roll downward over the platen during a recording cycle, said length of paper being uniform for each recorded message, and a knife automatically operated by a motor when said prescribed length of paper has been fed through the platen to cut off the recorded message.

6. A facsimile recorder having a stylus recording device, a sheet metal platen for supporting a sheet of paper in operative relation to said device, mechanism for feeding paper downward over said platen during recording thereon, automatic means for stopping said mechanism when a prescribed length of paper has been fed out of said platen during a recording cycle, said length of paper being the same for each recorded message and hanging down below the platen, a pivoted knife mounted below the platen, motor driven connections automatically actuated upon the stopping of said paper feed mechanism to swing the knife forward to cut off the hanging length of paper, and means automatically operative by said motor driven connections during the return swing of said knife to deenergize the driving motor.

7. A facsimile recorder comprising a base, a casing mounted on said base to provide a message compartment, a stand secured to said base and extending around said casing, a frame mounted on said stand, said frame having a bottom plate and two sides, a depending platen supported on said frame and adapted to hold a flat sheet of paper for downward movement, means mounted on said frame for feeding paper from a continuous supply roll down through the platen, said bottom plate having a slot for passage of the paper into said compartment, recording mechanism carried by said frame and having a plurality of styluses movable in a scanning track along the lower edge of said platen, a knife mounted below said plate and movable parallel thereto along a line adjacent to said slot, a motor for operating said knife to cut off the recorded message hanging in the compartment, and means controlled by said paper feed means for automatically energizing the knife motor when a predetermined length of paper has been fed into said compartment.

References Cited in the file of this patent

UNITED STATES PATENTS

| | | |
|---|---|---|
| 1,251,762 | Esterline | Jan. 1, 1918 |
| 1,469,988 | Bryce et al. | Oct. 9, 1923 |
| 1,637,852 | Brandenburg | Aug. 2, 1927 |
| 2,172,539 | Kimmich | Sept. 12, 1939 |
| 2,391,765 | Artzt | Dec. 25, 1945 |
| 2,437,242 | Cole et al. | Mar. 9, 1948 |
| 2,511,892 | Wise | June 20, 1950 |
| 2,520,918 | Elarde | Sept. 5, 1950 |
| 2,529,907 | Blakeslee et al. | Nov. 9, 1950 |
| 2,540,081 | Alden | Feb. 6, 1951 |
| 2,543,779 | Hester et al. | Mar. 6, 1951 |
| 2,575,959 | Hogan | Nov. 20, 1951 |
| 2,613,124 | Covely et al. | Oct. 7, 1952 |
| 2,614,902 | Barvitius | Oct. 21, 1952 |
| 2,639,211 | Hallden et al. | May 19, 1953 |
| 2,651,561 | Benham | Sept. 8, 1953 |